United States Patent
Nishiguchi et al.

(10) Patent No.: US 7,994,263 B2
(45) Date of Patent: Aug. 9, 2011

(54) REACTION PRODUCT OF EPOXY RESINS, BISPHENOL, XYLENE-FORMALDEHYDE AND AMINE IN CATIONIC ELECTRODEPOSITION PAINT

(75) Inventors: Shigeo Nishiguchi, Hiratsuka (JP); Akihiko Shimasaki, Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 318 days.

(21) Appl. No.: 12/153,332

(22) Filed: May 16, 2008

(65) Prior Publication Data
US 2008/0287612 A1    Nov. 20, 2008

(30) Foreign Application Priority Data
May 18, 2007 (JP) ................................. 2007-132244

(51) Int. Cl.
B32B 27/38 (2006.01)
C08L 63/00 (2006.01)
C08L 63/02 (2006.01)
B32B 15/08 (2006.01)
C08K 3/20 (2006.01)

(52) U.S. Cl. ......... 525/486; 428/413; 428/418; 523/440

(58) Field of Classification Search .................. None
See application file for complete search history.

(56) References Cited

U.S. PATENT DOCUMENTS

| 4,698,141 A * | 10/1987 | Anderson et al. ............. 204/503 |
| 4,867,854 A | 9/1989 | McIntyre |
| 4,868,230 A | 9/1989 | Rao et al. |
| 4,883,572 A | 11/1989 | Rao et al. |
| 6,342,546 B1 * | 1/2002 | Kato et al. .................... 523/415 |
| 6,734,260 B2 | 5/2004 | Nishiguchi et al. |
| 2006/0009593 A1 * | 1/2006 | Iijima et al. .................. 525/523 |

FOREIGN PATENT DOCUMENTS

| EP | 025340581 | 8/1993 |
| JP | 63-92637 | 4/1988 |
| JP | 8-245750 | 9/1996 |
| JP | 2001-003005 | 9/2001 |
| JP | 2003-221547 | 8/2003 |
| JP | 2006-274234 | 12/2006 |

* cited by examiner

Primary Examiner — Robert Sellers
(74) Attorney, Agent, or Firm — Wenderoth, Lind & Ponack, L.L.P.

(57) ABSTRACT

This invention discloses a cationic electrodeposition paint composition containing an amino group-containing modified epoxy resin which is obtained through reaction of specific modified epoxy resin with xylene formaldehyde resin having phenolic hydroxyl groups and amino group-containing compound. The cationic electrodeposition paint composition excels in film thickness retention, finished appearance of coating film and electrocoatability of galvanized alloy steel sheet and can form coating film having good corrosion resistance, even when its content of volatile organic compound (VOC) is reduced.

12 Claims, No Drawings

REACTION PRODUCT OF EPOXY RESINS, BISPHENOL, XYLENE-FORMALDEHYDE AND AMINE IN CATIONIC ELECTRODEPOSITION PAINT

TECHNICAL FIELD

This invention relates to cationic electrodeposition paint compositions containing as the resin component amino group-containing modified epoxy resin excelling in water dispersibility. In particular, the invention relates to cationic electrodeposition paint compositions which, even when the quantity of volatile organic compound in cationic electrocoating bath is reduced, still exhibits excellent film thickness retention, finished appearance of coating film and electrocoatability on galvanized alloy steel sheet and can form coating film of good corrosion resistance, and also to the coated articles for which the compositions are used.

BACKGROUND ART

Cationic electrodeposition paint compositions excel in coating workability, and films formed thereof exhibit good corrosion resistance. Hence they are widely used as undercoat of electrically conductive metallic articles such as car bodies which require these properties.

Base resins which are used in cationic electrodeposition paint compositions normally are produced using organic solvent, and are blended in the form of organic solvent-containing resin solutions (varnishes). Resulting cationic electrodeposition paint compositions, therefore, become organic solvent-containing paint compositions.

Cationic electrodeposition paint compositions also are usually blended with organic solvent of good hydrophilicity/hydrophobicity balance, such as ethylene glycol monobutyl ether (boiling point, 171° C.), ethylene glycol monohexyl ether (boiling point, 208° C.), propylene glycol monopropyl ether (boiling point, 150° C.), cyclohexanone (boiling point, 145° C.) and the like, for such purposes as improving water dispersibility of the resin component to increase paint stability and improving film thickness retention with time, finished appearance of coating film and electrocoatability on galvanized alloy steel sheet.

On the other hand, use of these organic solvents is restricted in recent years for consideration of environments, by volatile organic compound (VOC) regulation or harmful atmospheric pollutants (HAPs) regulation.

However, when volatile organic compound content of cationic electrodeposition paint composition is reduced, such drawbacks as deterioration in film thickness retention with time, finished appearance of coating film or electrocoatability of galvanized alloy steel sheet may occur.

JP Sho 63 (1988)-92637A discloses electrodeposition paint containing cationic epoxy resin which is produced by adding organic acid and water to a resin obtained through reaction of a composition comprising diglycidyl ether of at least one kind of polyol and diglycidyl ether of at least one kind of dihydric phenol, with at least one kind of dihydric phenol, to convert the oxysilane groups in said resin to cationic groups. Coating film formed by electrocoating the electrodeposition paint comprising the cationic epoxy resin, however, shows insufficient corrosion resistance.

JP 2003-221547A discloses cationic electrodeposition paint containing as the base resin xylene formaldehyde resin-modified, amino group-containing epoxy resin formed through reaction of an epoxy resin having epoxy equivalent of 180-2,500 with xylene formaldehyde resin and amino group-containing compound. The cationic electrodeposition paint containing the xylene formaldehyde resin-modified, amino group-containing epoxy resin as the base resin, however, may show defect in either of film thickness retention, finished appearance of coating film and electrocoatability on galvanized alloy steel sheet, when its organic solvent content is decreased for VOC reduction.

JP Hei 8 (1996)-245750A discloses cationic electrodeposition paint containing an epoxy resin produced from diglycidyl ether of polyether polyol, which has an average epoxy equivalent of 350-5,000, or an epoxy resin produced from glycidyl ether of partially capped polyether polyol, which has an average epoxy equivalent of 300-5,000. A large amount of organic solvent must be added, however, for the cationic electrodeposition paint containing such an epoxy resin to exhibit favorable electrocoatability of galvanized alloy steel sheet, and the purpose of reducing volatile organic compound cannot be accomplished.

JP 2001-3005A discloses a low VOC-containing paint excelling in film-forming property, electrocoatability of galvanized alloy steel sheet and corrosion resistance, which contains alkylene-type polyether polyol such as polymethylene glycol, polyethylene glycol, polypropylene glycol or polybutylene glycol, or polyether polyol such as bisphenol alone or aromatic ring-containing polyether polyol obtained through reaction of bisphenol with glycol, as an additive. Also JP 2006-274234A discloses high stability electrodeposition paint which can form coating film free of pinholes and of excellent corrosion resistance when electrocoated on rust-preventive steel sheet, of which volatile organic solvent (VOC) content is reduced by blending specific polyether compound having a molecular weight not more than 1,000 as an additive. When a large amount of the additive disclosed in JP 2001-3005A or JP 2006-274234A is added to electrodeposition paint, however, corrosion resistance of formed coating film may drop, or the paint stability may drop when mechanical load is exerted on the electrocoating bath over a prolonged period.

DISCLOSURE OF THE INVENTION

The object of the present invention is to provide a cationic electrodeposition paint composition which, even with reduced volatile organic compound (VOC) content, excels in film thickness retention, finished appearance of the coating film and electrocoatability of galvanized alloy steel sheet and can form coating film having high corrosion resistance.

We have engaged in concentrative studies to now discover that the above object could be accomplished by a cationic electrodeposition paint composition containing amino group-containing modified epoxy resin as the resin component, said resin being obtained by reacting a specific modified epoxy resin with xylene formaldehyde resin having phenolic hydroxyl groups and amino group-containing compound. Whereupon the present invention is completed.

Thus, according to the invention, a cationic electrodeposition paint composition characterized by comprising, as the resin component, an amino group-containing modified epoxy resin (I) which is obtained by reacting:

(A) a modified epoxy resin obtained through reaction of a diepoxy compound (a1) selected from the group consisting of the compounds (a-11) represented by a general formula (1):

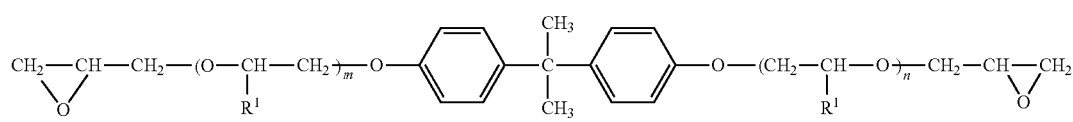

(1)

[in which m+n $R^1$s may be the same or different and each stands for hydrogen atom or $C_{1-6}$ alkyl group; m and n each is an integer of 0 or 1-20, and m+n is 1-20]

and the compounds (a-12) represented by a general formula (2):

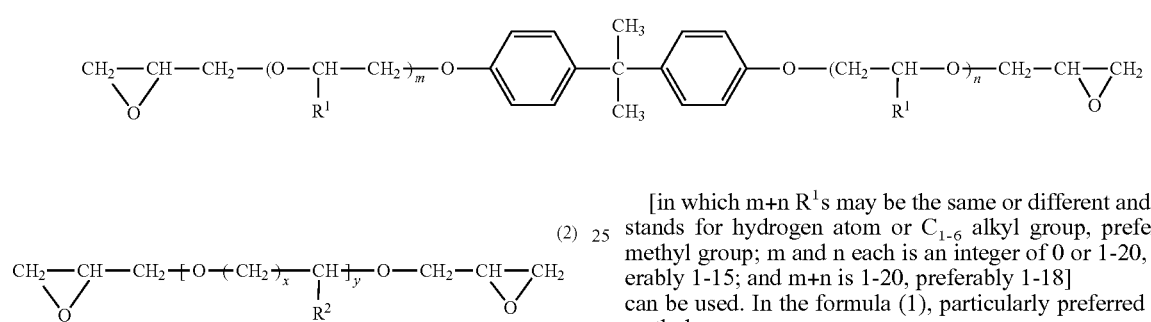

[in which y $R^2$s may be the same or different and each stands for hydrogen atom or $C_{1-6}$ alkyl group; x is an integer of 1-9, and y is an integer of 1-50]
with epoxy resin (a2) having an epoxy equivalent of 170-500 and bisphenols (a3);

(B) xylene formaldehyde resin having phenolic hydroxyl groups; and (C) amino group-containing compound.

The amino group-containing modified epoxy resin (I) which is contained in the cationic electrodeposition paint composition of the present invention as the resin component (base resin) exhibits excellent water-dispersibility, and the precipitated film shows good fusion at the time of electrocoating and good thermal flowability at the baking time. Furthermore, the resin excels in the ability to inhibit permeation through the coating film of corrosive substances (e.g., oxygen ion, chlorine ion and the like). Consequently, the cationic electrodeposition paint composition of the present invention has high paint stability such as, for example, ultrafiltration (UF) membrane applicability (U/F applicability) and filterability through precision filtering machine and, furthermore, use of the cationic electrodeposition paint composition of the present invention secures excellent film-forming property and film thickness retention even when volatile organic compound content of electrocoating bath prepared from the cationic electrodeposition paint composition is reduced, and can provide coated articles with coating films excelling in finished appearance, electrocoatability on galvanized alloy steel sheet, corrosion resistance and the like.

Hereinafter the cationic electrodeposition paint composition of the present invention is explained in further details.

Modified Epoxy Resin (A):

The modified epoxy resin (A) used as a starting material in the production of amino group-containing modified epoxy resin (I) which is used as the resin component (base resin) in the cationic electrodeposition paint composition of the present invention, is a resin obtained by reacting a diepoxy compound (a1) with an epoxy resin (a2) and bisphenols (a3).

Diepoxy Compound (a1)

As the diepoxy compound (a1), those compounds (a11) represented by the general formula (1)

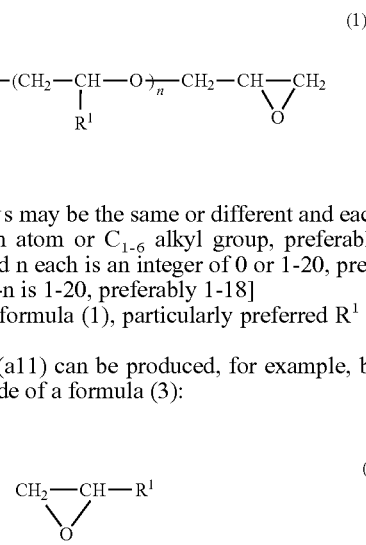

[in which m+n $R^1$s may be the same or different and each stands for hydrogen atom or $C_{1-6}$ alkyl group, preferably methyl group; m and n each is an integer of 0 or 1-20, preferably 1-15; and m+n is 1-20, preferably 1-18]
can be used. In the formula (1), particularly preferred $R^1$ is methyl group.

Such compound (a11) can be produced, for example, by adding alkylene oxide of a formula (3):

$$CH_2\text{—}CH\text{—}R^1 \quad (3)$$
$$\backslash O /$$

[in which $R^1$ has the previously given definition]
to bisphenol A to form a hydroxyl-terminated polyether compound and reacting the same with epihalohydrin for diepoxidation.

As the alkylene oxide of the formula (3), for example, ethylene oxide, propylene oxide, butylene oxide and the like can be named, ethylene oxide (the compound of the formula (3) in which $R^1$ is hydrogen) and propylene oxide (the compound of the formula (3) in which $R^1$ is methyl) being preferred.

As the diepoxy compound (a1), those compounds (a12) represented by a general formula (2):

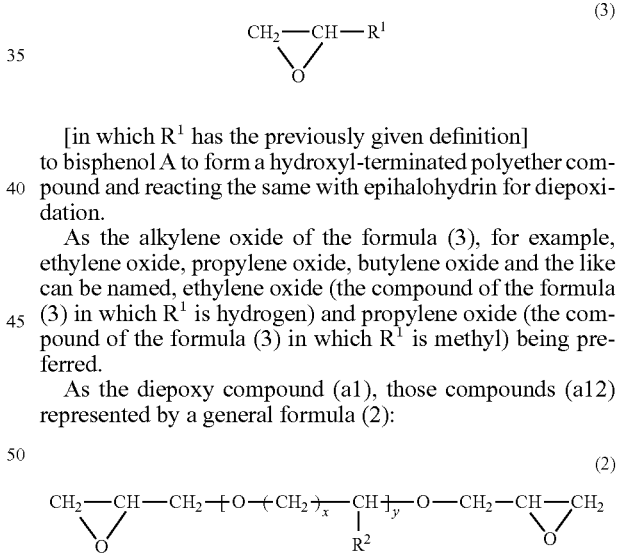

[in the formula, y $R^2$s may be the same or different and each stands for hydrogen atom or $C_{1-6}$ alkyl group, preferably methyl group; x is an integer of 1-9, preferably 1-5, and y is an integer of 1-50, preferably 1-25]
can also be used. In the formula (2), it is particularly preferred that $R^2$ is methyl group.

Such compounds (a12) can be produced, for example, either by ring-opening polymerizing alkylene oxide of the formula (3) using alkylene glycol as the initiator, and diepoxidizing the resulting hydroxyl-terminated polyalkylene oxide by reacting epihalohydrin therewith; or reacting polyether diol obtained through dehydrative condensation of alkylene glycol of a formula (4)

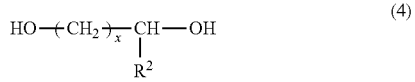

(4)

[in which $R^2$ and x have the previously given definitions] or at least two molecules of the alkylene glycol, with epihalohydrin for diepoxidation.

As alkylene glycol of the formula (4), for example, $C_{2-10}$ alkylene glycols such as ethylene glycol, propylene glycol, trimethylene glycol, 1,4-butanediol, 1,3-butanediol, 1,5-pentanediol, 1,6-hexanediol, 1,8-octanediol and the like can be named.

Specific examples of the compounds (a11) or (a12) of the formulae (1) or (2), i.e., diepoxy compounds (a1), include DENACOL EX-850, DENACOL EX-821, DENACOL EX-830, DENACOL EX-841, DENACOL EX-861, DENACOL EX-941, DENACOL EX-920 and DENACOL EX-931 (tradename, Nagase Chemtex Corporation); Glyciale PP-300P and Glyciale BPP-350 (tradename, Sanyo Chemical Industries, Ltd.). It is also possible to use mixtures of (a11) with (a12) as the diepoxy compound (a1).

Epoxy Compound (a2)

The epoxy compound (a2) is a compound containing at least two epoxy groups per molecule, which preferably has a number-average molecular weight generally within a range of 340-1,500, in particular, 340-1,000, and an epoxy equivalent generally within a range of 170-500, in particular, 170-400. Of these, the epoxy compounds prepared by reaction of polyphenol compound with epihalohydrin are preferred.

In the present specification, "number-average molecular weight" is determined following the method prescribed by JIS K 0124-83, from the chromatogram obtained with $R^1$ refractometer using, as separation columns, four columns of TSKgel G4000HXL, TSKgel G3000HXL, TSKgel G2500HXL and TSKgel G2000HXL (tradename, Tosoh Corporation), and tetrahydrofuran for GPC as the eluent, at the temperature of 40° C. and a flow rate of 1.0 ml/min.; and calibration curve of standard polystyrene.

Examples of the polyphenol compounds useful for the production of epoxy compound (a2) include bis(4-hydroxyphenyl)-2,2-propane (bisphenol A), bis(4-hydroxyphenyl) methane (bisphenol F), bis(4-hydroxycyclohexyl)methane (hydrogenated bisphenol F), 2,2-bis(4-hydroxycyclohexyl) propane (hydrogenated bisphenol A) 4,4'-dihydroxybenzophenone, bis(4-hydroxyphenyl)-1,1-ethane, bis(4-hydroxyphenyl)-1,1-isobutane, bis(4-hydroxy-2- or -3-tert-butylphenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak and the like.

Also as the epoxy compound obtained through the reaction of such polyphenol compound with epihalohydrin, particularly those derived from bisphenol A and represented by the formula (5) are preferred:

of jER828EL and jER1001 by Japan Epoxy Resin Co., Ltd. can be used.

Bisphenols (a3)

Bisphenols (a3) include compounds represented by a general formula (6):

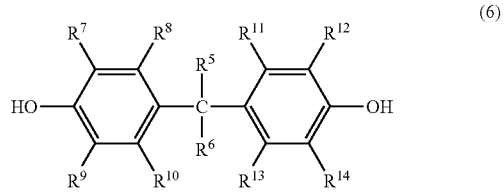

(6)

[in the formula, $R^5$ and $R^6$ each stands for hydrogen atom or $C_{1-6}$ alkyl group, preferably hydrogen atom or methyl group; and $R^7$, $R^8$, $R^9$, $R^{10}$, $R^{11}$, $R^{12}$, $R^{13}$ and $R^{14}$ each stands for hydrogen atom or $C_{1-6}$ alkyl group, preferably hydrogen atom]

Specific examples of which including bis(4-hydroxyphenyl)-2,2-propane (bisphenol A), bis(4-hydroxyphenyl)methane (bisphenol F) and the like.

Modified epoxy resin (A) can be normally produced by reacting above-described diepoxy compound (a1), epoxy resin (a2) and bisphenols (a3), suitably in the presence of a catalyst for the reaction such as tertiary amine (e.g., dimethylbenzylamine, tributylamine and the like) or quaternary ammonium salt (e.g., tetraethylammonium bromide, tetrabutylammonium bromide and the like), at temperatures of about 80-about 200° C., preferably about 90-about 180° C., for around 1-6 hours, preferably around 1-5 hours.

More specifically, modified epoxy resin (A) can be obtained by either mixing all of the diepoxy compound (a1), epoxy resin (a2) and bisphenols (a3) and allowing them to react; first reacting the diepoxy compound (a1) with bisphenols (a3) and then reacting the resulting reaction product with the epoxy resin (a2); or first reacting the epoxy resin (a2) with bisphenols (a3) and reacting the resulting reaction product with the diepoxy compound (a1). The progress in such reactions can be traced by epoxy value.

In the above reaction, a minor amount of secondary amine such as diethylamine, dibutylamine, diethanolamine, dipropanolamine, methylethanolamine and the like may be used as the reaction catalyst. These secondary amines react with epoxy groups of the epoxy resin (a2) to form tertiary amines which act as the reaction catalyst.

The use ratio of the diepoxy compound (a1), epoxy resin (a2) and bisphenols (a3) in the above reaction, based on the total solid mass of these three components, can be as follows:

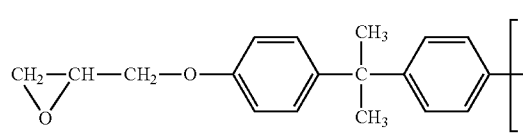

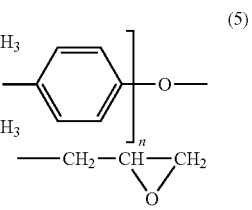

(5)

[in the formula, n is 0-2].

As commercially available epoxy resins covered by the above formula, for example, those sold under the tradenames diepoxy compound (a1), within a range of generally 1-35 mass %, in particular, 2-30 mass %, inter alia 2-25 mass %; epoxy resin (a2), within a range of generally 10-80 mass %, in particular, 15-75 mass %, inter alia, 20-70 mass %; and bisphenols (a3), within a range of generally 10-60 mass %, in particular, 15-50 mass %, inter alia, 18-45 mass %.

In the above reaction, solvent can be suitably used. Examples of useful solvent include hydrocarbon solvents such as toluene, xylene, cyclohexane, n-hexane and the like; ester solvents such as methyl acetate, ethyl acetate, butyl acetate and the like; ketone solvents such as acetone, methyl ethyl ketone, methyl isobutyl ketone, methyl amyl ketone and the like; amide solvents such as dimethylformamide, dimethylacetamide and the like; alcohol solvents such as methanol, ethanol, n-propanol, iso-propanol and the like; aromatic alkyl alcohols such as phenylcarbinol, methylphenylcarbinol and the like; ether alcoholic compounds such as ethylene glycol monobutyl ether, diethylene glycol monoethyl ether and the like; and mixtures of the foregoing.

Thus obtained modified epoxy resin (A) has a number-average molecular weight within a range of generally 800-7,000, in particular, 1,000-6,000, inter alia, 1,000-5,000; and an epoxy equivalent within a range of generally 500-3,000, preferably 600-2,500, inter alia, 600-2,000.

Xylene Formaldehyde Resin (B) Having Phenolic Hydroxyl Groups

Xylene formaldehyde resin (B) having phenolic hydroxyl groups, which is used as a starting material for production of the amino group-containing modified epoxy resin (I), contributes to internal plasticization (modification) of the modified epoxy resin (A), without reducing corrosion resistance of coating film. It can be easily prepared, for example, by condensation reaction of xylene, formaldehyde and phenols in the presence of an acidic catalyst.

As the formaldehyde, for example, compounds which generate formaldehyde, such as industrially readily available formaline, paraformaldehyde, trioxane and the like can be used. Incidentally, in the present specification, when polymer of paraformaldehyde or trioxane is used as formaldehyde, its use amount is specified based on one formaldehyde molecule.

The phenols include monohydric or dihydric phenolic compounds having two or three reaction sites, specific examples of which including phenol, creols, para-octylphenol, nonylphenol, bisphenolpropane, bisphenolmethane, resorcinol, pyrocatechol, hydroquinone, para-tert-butylphenol, bisphenolsulfone, bisphenol ether, para-phenylphenol and the like. These can be used either alone or in combination of two or more. Of these, phenol and cresols are particularly preferred.

As the acidic catalyst to be used in the condensation reaction of xylene, formaldehyde and phenols, for example, sulfuric acid, hydrochloric acid, paratoluenesulfonic acid, oxalic acid and the like can be named, while generally sulfuric acid is particularly preferred. Its adequate use rate is, in terms of concentration in aqueous solution because normally it is diluted with the water in aqueous formaldehyde solution, within the range of 10-50 mass %.

The condensation reaction can be carried out by heating the system to temperatures at which xylene, phenols, water, formaline and the like which are present in the reaction system reflux, normally about 80-about 100° C. The reaction can be terminated normally in around 2-6 hours, whereupon producing liquid xylene formaldehyde resin.

Thus obtained xylene formaldehyde resin (B) having phenolic hydroxyl groups can have a viscosity within a range of generally 20-50,000 mPa·s (25° C.), preferably 25-30,000 mPa·s (25° C.), inter alia, 30-15,000 mPa·s (25° C.), and preferably a hydroxyl equivalent within a range of generally 100-50,000, in particular, 150-30,000, inter alia, 200-10,000.

Amino Group-Containing Compound (C):

The amino group-containing compound (C) to be reacted with modified epoxy resin (A) is a cationic property-imparting component to introduce amino groups into the modified epoxy resin for cationizing said resin, and contains at least one active hydrogen which reacts with epoxy group.

Examples of amino group-containing compound (C) used for such purpose include mono- or di-alkylamines such as monomethylamine, dimethylamine, monoethylamine, diethylamine, monoisopropylamine, diisopropylamine, monobutylamine, dibutylamine and the like; alkanolamines such as monoethanolamine, diethanolamine, mono(2-hydroxypropyl)amine, di(2-hydroxypropyl)-amine, monomethylaminoethanol, monoethylaminoethanol and the like; alkylenepolyamines such as ethylenediamine, propylenediamine, butylenediamine, hexamethylenediamine, tetraethylenepentamine, pentaethylenehexamine, diethylaminopropylamine, diethylenetriamine, triethylenetetramine and the like; alkyleneimines such as ethyleneimine, propyleneimine and the like; and cyclic amines such as piperazine, morpholine, pyrazine and the like. Amines obtained by ketiminating primary amines can also be used concurrently with these named above.

Amino Group-Containing Modified Epoxy Resin (I):

Amino group-containing modified epoxy resin (I) which is used as the resin component in the cationic electrodeposition paint compositions of the present invention can be produced by addition reaction of xylene formaldehyde resin (B) having phenolic hydroxyl groups and amino group-containing compound (C) to modified epoxy resin (A), by the means known per se.

The reaction of xylene formaldehyde resin (B) having phenolic hydroxyl groups and amino group-containing compound (C) with modified epoxy resin (A) can be carried out by optional order, while preferably the xylene formaldehyde resin (B) having phenolic hydroxyl groups and amino group-containing compound (C) are simultaneously subjected to the addition reaction to the modified epoxy resin (A).

The addition reaction can be carried out in solvent, examples of useful solvent including hydrocarbon solvents such as toluene, xylene, cyclohexane, n-hexane and the like; ester solvents such as methyl acetate, ethyl acetate, butyl acetate and the like; ketone solvents such as acetone, methyl ethyl ketone, methyl isobutyl ketone, methyl amyl ketone and the like; amide solvents such as dimethylformamide, dimethylacetamide and the like; alcohol solvents such as methanol, ethanol, n-propanol, iso-propanol and the like; aromatic alkyl alcohols such as phenylcarbinol, methylphenylcarbinol and the like; ether alcoholic compounds such as ethylene glycol monobutyl ether, diethylene glycol monoethyl ether and the like; and mixtures of the foregoing.

The use ratio of each of the components in the above addition reaction is not strictly limited, but can be suitably varied according to, for example, utility of individual electrodeposition paint composition. Whereas, based on the total solid mass of the modified epoxy resin (A), xylene formaldehyde resin (B) having phenolic hydroxyl groups and amino group-containing compound (C), preferably the modified epoxy resin (A) is within a range of generally 50-90 mass %, in particular, 50-85 mass %, inter alia, 53-80 mass %; xylene formaldehyde resin (B) having phenolic hydroxyl groups is within a range of generally 1-35 mass %, in particular, 2-30 mass %, inter alia, 2-25 mass %; and amino group-containing compound (C) is within a range of generally 5-25 mass %, in particular, 6-20 mass %, inter alia, 6-18 mass %.

The above addition reaction can be normally carried out at temperatures of about 80-about 170° C., preferably about 90-about 150° C., for around 1-6 hours, preferably around 1-5 hours.

Crosslinking Agent:

Thermosetting cationic electrodeposition paint composition can be prepared by using the amino group-containing modified epoxy resin (I) in combination with a crosslinking agent such as, for example, blocked polyisocyanate, melamine resin and the like, in particular, a blocked polyisocyanate crosslinking agent, as a part of the resin component.

Blocked polyisocyanate crosslinking agent is an approximately stoichiometric addition reaction product of a polyisocyanate compound and an isocyanate-blocking agent. As the polyisocyanate compounds, those known per se can be used, for example, aromatic, aliphatic or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylenepolyphenyl isocyanate), bis(isocyanatomethyl)-cyclohexane, tetramethylene diisocyanate, hexamethylene diisocyanate, methylene diisocyanate, isophorone diisocyanate and the like; cyclized polymers or biuret bodies of these polyisocyanate compounds; or combinations of the foregoing.

From the viewpoint of corrosion resistance, aromatic polyisocyanate compounds such as tolylene diisocyanate, xylylene diisocyanate, phenylene diisocyanate, diphenylmethane-2,4'-diisocyanate, diphenylmethane-4,4'-diisocyanate, crude MDI and the like are particularly preferred.

Isocyanate-blocking agent is to add to and block isocyanate groups of those polyisocyanate compounds. Blocked polyisocyanate compounds produced of the addition are stable at ambient temperatures, but it is desirable that the blocking agent dissociates when heated to baking temperature of coating film (normally about 100-about 200° C.) to regenerate free isocyanate groups.

As the blocking agent used in blocked polyisocyanate crosslinking agent, for example, oxime compounds such as methyl ethyl ketoxime, cyclohexanone oxime and the like; phenolic compounds such as phenol, para-t-butylphenol, cresol and the like; aliphatic alcohols such as n-butanol, 2-ethylhexanol and the like; aromatic alkyl alcohols such as phenylcarbinol, methylphenylcarbinol and the like; ether alcoholic compounds such as ethylene glycol monobutyl ether, diethylene glycol monoethyl ether and the like; and lactam compounds such as ε-caprolactam, γ-butyrolactam and the like can be named.

The blend ratio of the amino group-containing modified epoxy resin and blocked polyisocyanate crosslinking agent in the resin component is, based on the total solid mass of the two: the amino group-containing modified epoxy resin, generally 50-85 mass %, preferably 55-80 mass %, inter alia, 55-78 mass %; and the blocked polyisocyanate crosslinking agent, generally 15-50 mass %, preferably 20-45 mass %, inter alia, 22-45 mass %.

Cationic Electrodeposition Paint Composition:

The cationic electrodeposition paint composition of the present invention can be prepared by formulating into paint the amino group-containing modified epoxy resin (I) and, where necessary, crosslinking agent, in particular, blocked polyisocyanate crosslinking agent following conventional practice; more specifically, by thoroughly mixing the amino group-containing modified epoxy resin (I) and optionally a crosslinking agent, with various paint additives such as surfactant, surface regulating agent and the like, and organic solvent, thereafter neutralizing the mixture with an acid, e.g., a water-soluble organic carboxylic acid such as acetic acid, formic acid, lactic acid and the like or mixtures thereof to make it water-soluble or water-dispersible, adding to the resulting emulsion pigment-dispersed paste, and further adding water to adjust the concentration.

Pigment-dispersed paste is a paste in which coloring pigment, rust-preventive pigment, extender and the like are finely dispersed in advance. It can be prepared by, for example, subjecting a pigment-dispersant, neutralizer and pigment to a dispersing treatment in a dispersing mixer such as ball mill, sand mill, pebble mill or the like.

As the pigment dispersant, those known per se can be used, examples of which including base resin containing hydroxyl groups and cationic groups; surfactant; and pigment-dispersing resins such as tertiary amine type epoxy resin, quaternary ammonium salt type epoxy resin, tertiary sulfonium salt type epoxy resin and the like. Such pigment dispersant can be used within a range of normally 1-150 mass parts, in particular, 10-100 mass parts, per 100 mass parts of the pigment used.

Examples of pigment include coloring pigments such as titanium dioxide, Carbon Black, red iron oxide and the like; extenders such as clay, mica, baryta, calcium carbonate, silica and the like; and rust-preventive pigments such as aluminum phosphomolybdate, aluminum tripolyphosphate, zinc oxide (zinc flower) and the like.

The cationic electrodeposition paint compositions of the present invention can contain bismuth compound, where necessary, for inhibiting corrosion or rust. Examples of the bismuth compound including bismuth oxide, bismuth hydroxide, basic bismuth carbonate, bismuth nitrate, bismuth silicate and organic acid salts of bismuth.

In the cationic electrodeposition paint compositions of the invention, organic tin compound such as dibutyltin dibenzoate, dioctyltin oxide, dibutyltin oxide and the like may also be blended for improving curability of coating film. Whereas, it is possible to improve curability of the coating film without blending such organic tin compounds, by increasing the adding amount of, and/or finely dividing, aforesaid rust-preventive pigment such as zinc oxide (zinc flower) and/or bismuth compound.

The combined amount to be added of above described pigment, bismuth compound and organotin compound preferably is within a range of normally 1-100 mass parts, in particular, 10-50 mass parts, per 100 mass parts of the total solid content of the resin component, i.e., the amino group-containing modified epoxy resin (I), crosslinking agent and pigment-dispersing resin.

As organic solvent useful for the cationic electrodeposition paint compositions of the present invention, for example, the following can be named: alcoholic solvents such as methyl alcohol (water solubility: freely blendable), ethyl alcohol (water solubility: freely blendable), n-butyl alcohol (water solubility: 7.7 mass %), isopropyl alcohol (water solubility: freely blendable), 2-ethylhexanol (water solubility: 0.07 mass %), benzyl alcohol (water solubility: 3.8 mass %), ethylene glycol (water solubility: freely blendable) and propylene glycol (water solubility, freely blendable); ether solvents such as ethylene glycol monoethyl ether (water solubility: freely blendable), ethylene glycol monobutyl ether (water solubility: freely blendable), ethylene glycol monohexyl ether (water solubility: 0.99 mass %), ethylene glycol mono-2-ethylhexyl ether (water solubility: 0.09 mass %), diethylene glycol monobutyl ether (water solubility: freely blendable), propylene glycol monomethyl ether (water solubility: freely blendable), propylene glycol monophenyl ether (water solubility: insoluble), 3-methyl-3-methoxybutanol (water solubility: freely blendable), diethylene glycol monoethyl ether (water solubility: freely blendable) and diethylene glycol monobutyl ether (water solubility: freely blendable); ketone solvents such as acetone (water solubility: freely blendable), methyl isobutyl ketone (water solubility: 2.0 mass %), cyclohexanone (water solubility: 5.0 mass %), isophorone (water solubility: 1.2 mass %) and acetylacetone (water solubility: 12.5 mass %); ester solvents such as ethylene glycol monoethyl ether acetate (water solubility: 22.9 mass %) and ethylene glycol monobutyl ether acetate (water solubility: 0.9 mass %); and mixtures of the foregoing.

The content of the organic solvent (D) having a solubility parameter of 8-10 and water solubility of at least 95 mass %, in the cationic electrocoating bath prepared of the cationic electrodeposition paint composition of the invention is preferably not more than 1.0 mass %, in particular, not more than 0.5 mass %, based on the total mass of the cationic electrocoating bath; and the total amount of organic solvent contained in the cationic electrocoating bath is preferably not more than 2.0 mass %, in particular, not more than 1.5 mass %, in order to allow the bath to effectively exhibit the paint performance such as film thickness retention, finished appearance of coating film, electrocoatability of galvanized alloy steel sheet and the like, with reduced volatile organic compound content.

Specific examples of organic solvent (D) include ethylene glycol monobutyl ether and diethylene glycol monobutyl ether.

Also for achieving reduction in the amount of organic solvent (VOC reduction) as aimed at by the cationic electrodeposition paint compositions of the present invention, it is convenient to desolvent the emulsions which are obtained in the preparation stage of the cationic electrodeposition paint compositions. By the desolventing, it becomes possible to control the content of organic solvent (D) and total amount of organic solvent in the cationic electrocoating bath to be within the above-specified ranges.

As the coating objects to which the cationic electrodeposition paint compositions are applicable, for example, metallic materials such as cold-rolled steel sheet, galvanized alloy steel sheet, electrogalvanized steel sheet, electrolytic zinc-iron electroplated steel sheet, organic composite plated steel sheet, Al material, Mg material and the like, and those metallic materials which are given such treatment as alkali degreasing where necessary, and thereafter surface treated, e.g., phosphatized or chromated; and car bodies, two-wheeler parts, household appliances and other machines and instruments shaped of these metallic materials can be named, but are not limited thereto. In particular, coating objects comprising galvanized alloy steel sheet are suitable.

Cationic electrodeposition paint compositions of the present invention can be applied onto surfaces of such coating objects as above, by electrocoating. Cationic electrocoating can be generally carried out with an electrocoating bath formed of a cationic electrodeposition paint composition of the present invention which is diluted with deionized water or the like to have a solid concentration of about 5-about 40% and adjusted of its pH to fall within a range of 5.5-9.0, under the conditions of normally at the bath temperature of about 15-about 35° C. and applying electric current under exertion of electric pressure of 100-400 V, with the coating object serving as the cathode. After the electrocoating, normally the coated object is thoroughly washed with filtrate of ultrafiltration (UF filtrate), permeate of reverse osmosis (RO water), industrial water, pure water or the like, to be removed of excessively deposited cationic electrodeposition paint.

While the thickness of the electrocoated film is not particularly limited, it may generally range 5-40 μm, preferably 12-30 μm, based on the cured coating film. Baking of the coated film can be carried out by heating the electrocoated film with, for example, drying facilities such as electric hot air dryer, gas hot air dryer or the like, normally at 110-200° C., preferably 140-180° C., in terms of the surface temperature of the coated object, normally for 10-180 minutes, preferably 20-50 minutes. By the baking, the coating film can be cured.

Thus, coated articles having electrocoated film exhibiting excellent corrosion resistance can be obtained.

EXAMPLES

Hereinafter the invention is explained more specifically, referring to Production Examples, Examples and Comparative Examples, it being understood that the invention is not limited to them only. In those examples, "part" means mass part and "%" means mass %.

Production Example 1

Production of Phenol-Modified Xylene Formaldehyde Resin No. 1

A 2-liter separable flask equipped with a thermometer, reflux condenser and stirrer was charged with 480 parts of 50% formaline, 110 parts of phenol, 202 parts of 98% industrial sulfuric acid and 424 parts of meta-xylene, which were reacted at 84-88° C. for 4 hours. After termination of the reaction, the system was left standing to allow separation of the xylene solution in which the resin phase was dissolved, and the aqueous sulfuric acid phase, and the resin phase was washed with water three times. Distilling unreacted meta-xylene off from the resin phase by treating it under the conditions of 20-30 mmHg/120-130° C. for 20 minutes, 480 parts of phenol-modified xylene formaldehyde resin No. 1 having a viscosity of 1050 mPa·s (25° C.) was obtained.

Production Example 2

Production of Base Resin No. 1

A 2-liter flask equipped with a thermometer, reflux condenser and stirrer was charged with 352 parts of DENACOL EX-920 (note 1), 750 parts of jER828EL (note 5), 456 parts of bisphenol A and 0.8 part of tetrabutylammonium bromide, which were allowed to react at 160° C. until the product's epoxy equivalent reached 780.

Then 412 parts of methyl isobutyl ketone was added, followed by addition of 180 parts of the xylene formaldehyde resin No. 1, 136 parts of diethanolamine and 95 parts of ketimination product of methyl isobutyl ketone with diethylenetriamine (purity 84%, in the form of methyl isobutyl ketone solution) and 4 hours' reaction at 120° C. Thus a solution of base resin No. 1, which was an amino group-containing modified epoxy resin, having a solid resin content of 80% was obtained. The base resin No. 1 had an amine value of 56 mgKOH/g and number-average molecular weight of 2,000.

Production Example 3

Production of Base Resin No. 2

A 2-liter flask equipped with a thermometer, reflux condenser and stirrer was charged with 352 parts of DENACOL EX-931 (note 3), 938 parts of jER828EL (note 5), 456 parts of bisphenol A and 0.8 part of tetrabutylammonium bromide, which were allowed to react at 160° C. until the epoxy equivalent reached 930.

Then 489 parts of methyl isobutyl ketone was added, followed by addition of 180 parts of the xylene formaldehyde resin No. 1 as obtained in Production Example 1, 136 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 2, which was an amino group-containing modified epoxy resin, having a solid resin content of 80% was obtained. The base resin No. 2 had an amine value of 48 mgKOH/g and number-average molecular weight of 2,400.

Production Example 4

Production of Base Resin No. 3

A 2-liter flask equipped with a thermometer, reflux condenser and stirrer was charged with 340 parts of Glyciale BPP-350 (note 4), 938 parts of jER828EL (note 5), 456 parts of bisphenol A and 0.8 part of tetrabutylammonium bromide, which were allowed to react at 160° C. until the epoxy equivalent reached 870.

Then 456 parts of methyl isobutyl ketone was added, followed by addition of 180 parts of the xylene formaldehyde resin No. 1 as obtained in Production Example 1, 136 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 3, which was an amino group-containing modified epoxy resin, having a solid resin content of 80% was obtained. The base resin No. 3 had an amine value of 51 mgKOH/g and number-average molecular weight of 2,200.

Production Example 5

Production of Base Resin No. 4

A 2-liter flask equipped with a thermometer, reflux condenser and stirrer was charged with 185 parts of DENACOL EX-821 (note 2), 938 parts of jER828EL (note 5), 456 parts of bisphenol A and 0.8 part of tetrabutylammonium bromide, which were allowed to react at 160° C. until the epoxy equivalent reached 790.

Then 418 parts of methyl isobutyl ketone was added, followed by addition of 180 parts of the xylene formaldehyde resin No. 1 as obtained in Production Example 1, 136 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 4, which was an amino group-containing modified epoxy resin, having a solid resin content of 80% was obtained. The base resin No. 4 had an amine value of 55 mgKOH/g and number-average molecular weight of 2,000.

Production Example 6

Production of Base Resin No. 5

A 2-liter flask equipped with a thermometer, reflux condenser and stirrer was charged with 56 parts of DENACOL EX-931 (note 3), 938 parts of jER828EL (note 5), 356 parts of bisphenol A and 0.8 part of tetrabutylammonium bromide, which were allowed to react at 160° C. until the epoxy equivalent reached 680.

Then 350 parts of methyl isobutyl ketone was added, followed by addition of 150 parts of the xylene formaldehyde resin No. 1 as obtained in Production Example 1, 136 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 5, which was an amino group-containing modified epoxy resin, having a solid resin content of 80% was obtained. The base resin No. 5 had an amine value of 64 mgKOH/g and number-average molecular weight of 1,700.

Production Example 7

Production of Base Resin No. 6

A 2-liter flask equipped with a thermometer, reflux condenser and stirrer was charged with 942 parts of DENACOL EX-931 (note 3), 375 parts of jER828EL (note 5), 228 parts of bisphenol A and 0.8 part of tetrabutylammonium bromide, which were allowed to react at 160° C., until the epoxy equivalent reached 780.

Then 409 parts of methyl isobutyl ketone was added, followed by addition of 180 parts of the xylene formaldehyde resin No. 1 as obtained in Production Example 1, 136 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 6, which was an amino group-containing modified epoxy resin, having a solid resin content of 80% was obtained. The base resin No. 6 had an amine value of 57 mgKOH/g and number-average molecular weight of 2,000.

Comparative Production Example 1

Production of Base Resin No. 7

A 2-liter flask equipped with a thermometer, reflux condenser and stirrer was charged with 352 parts of DENACOL EX-931 (note 3), 938 parts of jER828EL (note 5), 456 parts of bisphenol A and 0.8 part of tetrabutylammonium bromide, which were allowed to react at 160° C. until the epoxy equivalent reached 930.

Then 450 parts of methyl isobutyl ketone was added, followed by addition of 158 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 7, which was an amino group-containing modified epoxy resin, having a solid resin content of 80% was obtained. The base resin No. 7 had an amine value of 57 mgKOH/g and number-average molecular weight of 2,200.

Comparative Production Example 2

Production of Base Resin No. 8 (Following JP 2003-221547A)

A 2-liter flask equipped with a thermometer, reflux condenser and stirrer was charged with 1050 parts of jER828EL (note 5), 410 parts of bisphenol A and 0.6 part of tetrabutylammonium bromide, which were allowed to react at 160° C. until the epoxy equivalent reached 730.

Then 388 parts of methyl isobutyl ketone was added, followed by addition of 180 parts of the xylene formaldehyde resin No. 1 as obtained in Production Example 1, 136 parts of diethanolamine and 95 parts of a ketimination product of methyl isobutyl ketone with diethylenetriamine (purity 84%, in the form of methyl isobutyl ketone solution) and 4 hours' reaction at 120° C. Thus a solution of base resin No. 8, which was an amino group-containing modified epoxy resin, having a solid resin content of 80% was obtained. The base resin No. 8 had an amine value of 59 mgKOH/g and number-average molecular weight of 1,800.

The compositions and characteristic values of base resin Nos. 1-8 of Production Examples 2-7 and Comparative Production Examples 1 and 2 were as shown in the following Table 1.

Preparation of Emulsion

Production Example 9

Production of Emulsion No. 1

An emulsion was obtained by mixing 87.5 parts (solid content 70 parts) of base resin No. 1 as obtained in Production Examples 2 with 37.5 parts (solid content 30 parts) of the curing agent No. 1 as obtained in Production Example 8, further blending therewith 13 parts of 10% acetic acid, uniformly stirring the same and adding thereto 156 parts of deionized water dropwise over about 15 minutes, under violent stirring.

Then organic solvent extraction ("desolventing") from the resulting emulsion was carried out at 35° C. under reduced pressure (not higher than 50 mmHg) to reduce the methyl

TABLE 1

| | | | | Production Example 2 | Production Example 3 | Production Example 4 | Production Example 5 | Production Example 6 | Production Example 7 | Comparative Production Example 1 | Comparative Production Example 2 |
|---|---|---|---|---|---|---|---|---|---|---|---|
| | Base Resin | | | No. 1 | No. 2 | No. 3 | No. 4 | No. 5 | No. 6 | No. 7 | No. 8 |
| Composition | (A) | (a1) | DENACOL EX-920 (note 1) | 352 | | | | | | | |
| | | | DENACOL EX-821 (note 2) | | | | 185 | | | | |
| | | | DENACOL EX-931 (note 3) | | 352 | | | 56 | 942 | 352 | |
| | | | GLYCIALE BPP-350 (note 4) | | | 340 | | | | | |
| | | (a2) | jER828EL (note 5) | 750 | 938 | 938 | 938 | 938 | 375 | 938 | 1050 |
| | | (a3) | bisphenol A | 456 | 456 | 456 | 456 | 356 | 228 | 456 | 410 |
| | catalyst | | tetrabutylammonium bromide | 0.8 | 0.8 | 0.8 | 0.8 | 0.8 | 0.8 | 0.8 | 0.6 |
| | solvent | | methyl isobutyl ketone | 412 | 489 | 456 | 418 | 350 | 409 | 450 | 388 |
| | (B) | | xylene formaldehyde resin No. 1 | 180 | 180 | 180 | 180 | 150 | 180 | | 180 |
| | (C) | | diethanolamine | 136 | 136 | 136 | 136 | 136 | 136 | 158 | 136 |
| | | | ketimination product of methyl isobutyl ketone with diethylenetriamine | 95 | 95 | 95 | 95 | 95 | 95 | 95 | 95 |
| Characteristic Values | amine value (mgKOH/g) | | | 56 | 48 | 51 | 55 | 64 | 57 | 57 | 59 |
| | number-average molecular weight | | | 2000 | 2400 | 2200 | 2000 | 1700 | 2000 | 2200 | 1800 |

(Numerical values in the Composition are by parts)
(note 1) DENACOL EX-920: tradename, Nagase Chemtex Corporation, an epoxy resin (diepoxy compound (a1)) epoxy equivalent 176
(note 2) DENACOL EX-821: tradename, Nagase Chemtex Corporation, an epoxy resin (diepoxy compound (a1)), epoxy equivalent 185
(note 3) DENACOL EX-931: tradename, Nagase Chemtex Corporation, an epoxy resin (diepoxy compound (a1)), epoxy equivalent 471
(note 4) GLYCIALE BPP-350: tradename, Sanyo Chemical Co., Ltd., an epoxy resin (diepoxy compound (a1)), epoxy equivalent 340
(note 5) jER828EL: tradename, Japan Epoxy Resin Co., Ltd., an epoxy resin (a2), epoxy equivalent 190, number-average molecular weight 380

Production Example 8

Production of Curing Agent

Into a reactor 270 parts of COSMONATE M-200 (tradename, Mitsui Chemicals Inc., crude MDI) and 127 parts of methyl isobutyl ketone were added, and the content's temperature was raised to 70° C. Into the reactor then 236 parts of ethylene glycol monobutyl ether was added dropwise over an hour. The temperature was thereafter raised to 100° C., and while maintaining said temperature, the reaction was continued while sampling with time, until absorption attributable to unreacted isocyanate group became no more observable on infrared absorption spectrum measurement. Thus a curing agent having a solid resin content of 80% was obtained.

isobutyl ketone content of the emulsion to not higher than 1 mass %. Adding 3 parts of ethylene glycol monobutyl ether to the emulsion and adjusting the solid content with deionized water, emulsion No. 1 having a solid content of 34% was obtained.

Production Examples 10-19

Production of Emulsion Nos. 2-11

Emulsion Nos. 2-11 were prepared in the manner same to Production Example 9, except that the compositions as indicated in the following Table 2 were used.

TABLE 2

| | | Production Example 9 | Production Example 10 | Production Example 11 | Production Example 12 | Production Example 13 | Production Example 14 | Production Example 15 | Production Example 16 | Production Example 17 | Production Example 18 | Production Example 19 |
|---|---|---|---|---|---|---|---|---|---|---|---|---|
| Composition | Emulsion | No. 1 | No. 2 | No. 3 | No. 4 | No. 5 | No. 6 | No. 7 | No. 8 | No. 9 | No. 10 | No. 11 |
| | base resin No. 1 | 87.5 (70) | | | | | | 87.5 (70) | | | | |
| | base resin No. 2 | | 87.5 (70) | | | | | | 87.5 (70) | | | |
| | base resin No. 3 | | | 87.5 (70) | | | | | | | | |
| | base resin No. 4 | | | | 87.5 (70) | | | | | | | |
| | base resin No. 5 | | | | | 87.5 (70) | | | | | | |
| | base resin No. 6 | | | | | | 87.5 (70) | | | | | |
| | base resin No. 7 | | | | | | | | | 87.5 (70) | | |
| | base resin No. 8 | | | | | | | | | | 87.5 (70) | 87.5 (70) |
| | curing agent | 37.5 (30) | 37.5 (30) | 37.5 (30) | 37.5 (30) | 37.5 (30) | 37.5 (30) | 37.5 (30) | 37.5 (30) | 37.5 (30) | 37.5 (30) | 37.5 (30) |
| | 10% acetic acid | 13 | 13 | 13 | 13 | 13 | 13 | 13 | 13 | 13 | 13 | 13 |
| | deionized water | 156 | 156 | 156 | 156 | 156 | 156 | 156 | 156 | 156 | 156 | 156 |
| | Emulsion solid content 34% | 294 (100) | 294 (100) | 294 (100) | 294 (100) | 294 (100) | 294 (100) | 294 (100) | 294 (100) | 294 (100) | 294 (100) | 294 (100) |
| Added after desolventing | ethylene glycol monobutyl ether | 3 | 3 | 4 | 4 | 5 | 5 | | | | 4 | 4 | 10 |
| | diethylene glycol monobutyl ether | | | | | | | | 5 | | | |

Production Example 20

Production of Pigment-Dispersing Resin

To 1010 parts of jER828EL (tradename, Japan Epoxy Resin Co., Ltd., an epoxy resin), 390 parts of bisphenol A, 240 parts of PLACCEL 212 (tradename, Daicel Chemical Industries, Ltd., polycaprolactonediol, weight-average molecular weight 1,250) and 0.2 part of dimethylbenzylamine were added and allowed to react at 130° C. until the epoxy equivalent reached about 1090.

Then 134 parts of dimethylethanolamine and 150 parts of 90% aqueous lactic acid solution were added, and allowed to react at 120° C. for 4 hours. Further the solid content was adjusted by addition of methyl isobutyl ketone, to provide an ammonium salt type resin-derived pigment-dispersing resin having a solid content of 60%. The ammonium salt concentration of this dispersing resin was 0.78 mmol/g.

Production Example 21

Production of Pigment-Dispersed Paste No. 1

A pigment-dispersed paste No. 1 having a solid content of 55% was obtained by mixing 8.3 parts (solid content 5 parts) of the pigment-dispersing resin having a solid content of 60% as obtained in Production Example 20, 14.5 parts of titanium dioxide, 7.0 parts of purified clay, 0.3 part of Carbon Black, 1 part of dioctyltin oxide, 1 part of bismuth hydroxide and 20.2 parts of deionized water, and subjecting the mixture to a dispersing treatment in a ball mill for 20 hours.

Production Example 22

Production of Pigment-Dispersed Paste No. 2

A pigment-dispersed paste No. 2 having a solid content of 55% was obtained by mixing 8.3 parts (solid content 5 parts) of the pigment-dispersing resin having a solid content of 60% as obtained in Production Example 20, 14.5 parts of titanium dioxide, 6.0 parts of purified clay, 0.3 part of Carbon Black, 3.0 parts of zinc oxide and 20.2 parts of deionized water, and subjecting the mixture to a dispersing treatment in a ball mill for 20 hours.

Production of Cationic Electrodeposition Paint

Example 1

To 294 parts (solid content 100 parts) of emulsion No. 1 as obtained in Production Example 9, 52.4 parts (solid content 28.8 parts) of the 55% pigment-dispersed paste No. 1 and 297.6 parts of deionized water were added to provide cationic electrodeposition paint No. 1 having a solid content of 20%.

Examples 2-9

Cationic electrodeposition paint Nos. 2-9 were prepared each having the composition as shown in the following Table 3, in the manner same to Example 1.

TABLE 3

| | Example 1 | Example 2 | Example 3 | Example 4 | Example 5 | Example 6 | Example 7 | Example 8 | Example 9 |
|---|---|---|---|---|---|---|---|---|---|
| Cationic electrodeposition paint | No. 1 | No. 2 | No. 3 | No. 4 | No. 5 | No. 6 | No. 7 | No. 8 | No. 9 |
| Composition emulsion No. 1 | 294 (100) | | | | | | | 294 (100) | |
| emulsion No. 2 | | 294 (100) | | | | | | | |
| emulsion No. 3 | | | 294 (100) | | | | | | |
| emulsion No. 4 | | | | 294 (100) | | | | | |
| emulsion No. 5 | | | | | 294 (100) | | | | |
| emulsion No. 6 | | | | | | 294 (100) | | | |
| emulsion No. 7 | | | | | | | 294 (100) | | |
| emulsion No. 8 | | | | | | | | | 294 (100) |
| pigment dispersed paste No. 1 | 52.4 (28.8) | 52.4 (28.8) | 52.4 (28.8) | 52.4 (28.8) | 52.4 (28.8) | 52.4 (28.8) | 52.4 (28.8) | | 52.4 (28.8) |
| pigment dispersed paste No. 2 | | | | | | | | 52.4 (28.8) | |
| deionized water | 297.6 | 297.6 | 297.6 | 297.6 | 297.6 | 297.6 | 297.6 | 297.6 | 297.6 |
| Cationic electrodeposition paint solid content 20% | 644 (128.8) | 644 (128.8) | 644 (128.8) | 644 (128.8) | 644 (128.8) | 644 (128.8) | 644 (128.8) | 644 (128.8) | 644 (128.8) |

Numerals show blended amounts, and those in the parentheses, solid contents.

Comparative Examples 1-4

Cationic electrodeposition paint Nos. 10-13 were prepared in the manner same to Example 1, using the compositions as shown in the following Table 4.

TABLE 4

| | Comparative Example 1 | Comparative Example 2 | Comparative Example 3 | Comparative Example 4 |
|---|---|---|---|---|
| Cationic electrodeposition paint | No. 10 | No. 11 | No. 12 | No. 13 |
| Composition emulsion No. 9 | 294 (100) | | | 294 (100) |
| emulsion No. 10 | | 294 (100) | | |
| emulsion No. 11 | | | 294 (100) | |
| pigment dispersed paste No. 1 | 52.4 (28.8) | 52.4 (28.8) | 52.4 (28.8) | |
| pigment dispersed paste No. 2 | | | | 52.4 (28.8) |
| Deionized water | 297.6 | 297.6 | 297.6 | 297.6 |
| Cationic electrodeposition paint solid content 20% | 644 (128.8) | 644 (128.8) | 644 (128.8) | 644 (128.8) |

The numerals show blended amounts, and those in the parentheses, solid contents.

Preparation of Test Panels

Cold-rolled steel sheet (0.8 mm×150 mm×70 mm) applied with PALBOND # 3020 (tradename, Japan Parkerizing Co., phosphatization treating agent), or galvanized alloy steel sheet (0.8 mm×150 mm×70 mm) which had been given the same chemical conversion treatment were used as the coating objects, which were electrocoated with those cationic electrodeposition paints as obtained in the Examples and Comparative Examples, to provide the test panels. Using the test panels, later-described performance tests were conducted. The results were as shown in the following Tables 5 and 6.

TABLE 5

|  |  | Example 1 | Example 2 | Example 3 | Example 4 | Example 5 | Example 6 | Example 7 | Example 8 | Example 9 |
|---|---|---|---|---|---|---|---|---|---|---|
|  | Cationic electrodeposition paint | No. 1 | No. 2 | No. 3 | No. 4 | No. 5 | No. 6 | No. 7 | No. 8 | No. 9 |
| Organic solvent content of the bath (mass %) (note 6) | organic solvent A (note 7) | 0.47 | 0.47 | 0.62 | 0.62 | 0.78 | 0.78 |  | 0.47 |  |
|  | organic solvent B (note 8) |  |  |  |  |  |  | 0.78 |  |  |
|  | total content of organic solvent | 1.44 | 1.44 | 1.59 | 1.59 | 1.75 | 1.75 | 1.75 | 1.44 | 0.97 |
| Test result | electrocoatability of galvanized alloy steel sheet (note 9) | ⊙ | ⊙ | ○ | ⊙ | ⊙ | ⊙ | ⊙ | ⊙ | ○ |
|  | corrosion resistance (note 10) | ⊙ | ⊙ | ⊙ | ○ | ⊙ | ○ | ⊙ | ⊙ | ⊙ |
|  | exposure resistance (note 11) | ○ | ⊙ | ⊙ | ○ | ⊙ | ○ | ○ | ⊙ | ⊙ |
|  | finished appearance (note 12) | ○ | ○ | ○ | ○ | ○ | ○ | ○ | ○ | ○ |
|  | paint stability (water dispersibility) (note 13) | ⊙ | ⊙ | ⊙ | ⊙ | ⊙ | ○ | ⊙ | ⊙ | ⊙ |
|  | film thickness retention (note 14) | ○ | ⊙ | ○ | ○ | ⊙ | ⊙ | ○ | ○ | ○ |

TABLE 6

|  |  | Comparative Example 1 | Comparative Example 2 | Comparative Example 3 | Comparative Example 4 |
|---|---|---|---|---|---|
|  | Cationic electrodeposition paint | No. 10 | No. 11 | No. 12 | No. 13 |
| Organic solvent content of the bath (mass %) (note 6) | organic solvent A (note 7) | 0.62 | 0.62 | 1.55 | 0.62 |
|  | organic solvent B (note 8) |  |  |  |  |
|  | total content of organic solvent | 1.59 | 1.59 | 2.52 | 1.59 |
| Test result | electrocoatability of galvanized alloy steel sheet (note 9) | ○ | X | ⊙ | ○ |
|  | corrosion resistance (note 10) | Δ | ○ | ⊙ | Δ |
|  | exposure resistance (note 11) | Δ | Δ | ○ | Δ |
|  | finished appearance (note 12) | ○ | X | ○ | ○ |
|  | paint stability (water dispersibility) (note 13) | ○ | Δ | Δ | ○ |
|  | film thickness retention (note 14) | Δ | Δ | ○ | Δ |

(note 6) Organic solvent content of the bath: Ten (10) μl of each cationic electrodeposition paint was sucked into a microsyringe, injected into GC-15A (tradename, Shimadzu Corporation, gas chromatography) and the content was measured under the following conditions: Conditions: column WAX-10 (tradename, Supelco, Inc.) column temp. raised to 200° C. at a rate of 5° C./min. carrier gas He.

(note 7) Organic solvent A: ethylene glycol monobutyl ether, SP value 8.87, solubility in water 100 mass %

(note 8) Organic solvent B: diethylene glycol monobutyl ether, SP value 9.78, solubility in water 100 mass %

(note 9) Electrocoatability of galvanized alloy steel sheet: Galvanized alloy steel sheet of 0.8 × 150 × 70 mm in size, which had been chemical conversion treated with PALBOND # 3020 (tradename, Japan Perkerizing Co., a phosphatizing agent), was dipped in each electrocoating bath (30° C.) as the cathode, and electrocoated at 210 V with the electricity-applying time suitably adjusted to form 20 μm-thick coating film. Thus obtained coating film was baked and cured at 170° C. for 20 minutes. The number of pinholes within a 10 cm × 10 cm area of the resulting test piece was counted, and the paint's electrocoatability was evaluated according to the following standard: ⊙: No pinhole occurred. ○: One small pinhole occurred, which could be hidden with an intermediate coating film and was of no problem. Δ: Two(2) - 5 pinholes occurred. X: Ten(10) or more pinholes occurred.

(note 10) Corrosion resistance: Cold-rolled steel sheet of 0.8 × 150 × 70 mm in size, which had been chemical conversion treated with PALBOND # 3020 (tradename, Japan Perkerizing Co., a phosphatizing agent), was dipped in each of the cationic electrocoating bath and electrocoated. Baking the same with a hot air dryer at 170° C. for 20 minutes, test panels with 20 μm-thick cured coating film were obtained. Each coating film was crosscut with a cutter knife to the depth reaching the substrate of the test panel to 35° C. salt spray test for 840 hours following JIS Z-2371. According to the rusting and blistering width from the cuts and the coated surface condition of non-cut portion (blistering), corrosion resistance was evaluated on the following standard. ⊙: Maximum width of rusting or blistering from the cut was not more than 2.0 mm (single side). ○: Maximum width of rusting or blistering from the cut exceeded 2.0 mm but not more than 3.0 mm (single side). Δ: Maximum width of rusting or blistering from the cut exceeded 3.0 mm but not more then 3.5 mm (single side). X: Maximum width of rusting or blistering from the cut exceeded 3.5 mm.

(note 11) Exposure resistance Test panels which were prepared under the same conditions as those for the corrosion resistance test were spray-coated with WP-300 (tradename, Kansai Paint Co., a water-based intermediate paint) to a cured coating film thickness of 25 μm, and baked with an electric hot air dryer at 140° C. for 30 minutes. Further onto the above intermediate coating film, NEOAMILAC 6000 (tradename, Kansai Paint Co., a top coat paint) was spray coated to a cured film thickness of 35 μm, followed by baking with an electric hot air dryer at 140° C. for 30 minutes to provide test panels for the exposure resistance test. The film on the exposure resistance test panels was crosscut with a cutter knife to the depth reaching the substrate, and the panels were exposed outdoors in horizontal posture in Chikura Town, Chiba Prefecture (seaside region) for a year. The exposure resistance was evaluated on the following standard, according to the rusting and blistering width from the knife cuts. The maximum rusting or blistering width was: ⊙ less than 2 mm in single side from the cut, ○ at least 2 mm but less than 3 mm in single side from the cut, Δ at least 3 mm but less than 4 mm in single side from the cut, and X at least 4 mm in single side from the cut.

TABLE 6-continued

|  | Comparative Example 1 | Comparative Example 2 | Comparative Example 3 | Comparative Example 4 |
| --- | --- | --- | --- | --- |

(note 12) Finished appearance: Cold-rolled steel sheet of 0.8 × 150 × 70 mm in size, which had been chemical conversion treated with PALBOND # 3020 (tradename, Japan Perkerizing Co., a phosphatizing agent), was dipped in each of the cationic electrocoating bath and electrocoated. Thus obtained coating film was baked with a hot air dryer at 170° C. for 20 minutes. The surface roughness, Ra value, of resulting electrocoated film was measured with SURF TEST 301 (tradename Mitsutoyo Co., a surface roughness meter), and evaluated according to the following standard: ○: Ra value less than 0.25 Δ: Ra value at least 0.25 but less than 0.35 X: Ra value more than 0.35.
(note 13) Paint stability: Each of the cationic electrodeposition paints was stirred in a sealed container at 30° C. for 30 days. Thereafter whole of each cationic electrodeposition paint was filtered through 400 mesh filtration net, and the residual quantity (mg/L) on the filtration net was measured to provide the criteria for water dispersibility of the cationic electrodeposition paint: ⊚: less than 5 mg/L, ○: at least 5 mg/L but less than 10 mg/L, Δ: at least 10 mg/L but less than 15 mg/L, and X: atleast 15 mg/L.
(note 14) Film thickness retention: Cold-rolled steel sheet of 0.8 × 150 × 70 mm in size, which had been chemical conversion treated with PALBOND # 3020 (tradename, Japan Perkerizing Co., a phosphatizing agent), was dipped in each of the cationic electrocoating bath and electrocoated at 250 V for 3 minutes. The resulting coating film (1) was measured. Each of the cationic electrodeposition paints was stirred at 30° C. for 10 days in an open container. Thereafter the cold-rolled steel sheet was dipped in each electrocoating bath of the stirred paint and electrocoated at 250 V for 3 minutes. The resulting coating film (2) was measured. The film thickness retention was evaluated according to the following standard: ⊚: The difference in thickness between the coating film (1) and coating film (2) was less than 1 μm. ○: The difference in thickness between the coating film (1) and coating film (2) was at least 1 μm but less than 4 μm. Δ: The difference in thickness between the coating film (1) and coating film (2) was least 4 μm but less than 7 μm. X: The difference in thickness between the coating film (1) and coating film (2) was more than 7 μm.

The invention claimed is:

1. A cationic electrodeposition paint composition, which comprises as the resin component, an amino group-containing modified epoxy resin (I) which is obtained by reacting:
   (A) a modified epoxy resin obtained through reaction of a diepoxy compound (a1) selected from the group consisting of the compounds (a-11) represented by a general formula (1):

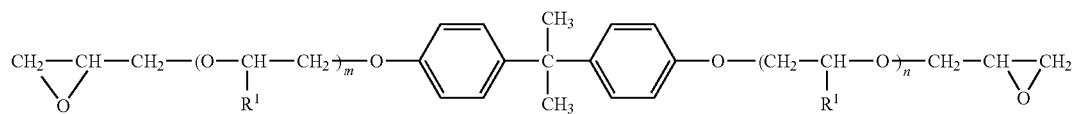

wherein m+n $R^1$s are the same or different and each stands for a hydrogen atom or a methyl group; m and n each is an integer of 0 or 1-20, and m+n is 1-20,
and the compounds (a-12) represented by a general formula (2):

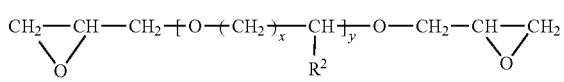

wherein y $R^2$s are the same or different and each stands for a hydrogen atom or a methyl group; x is an integer of 1-9, and y is an integer of 1-50, with epoxy resin (a2) having an epoxy equivalent of 170-500 and bisphenols (a3);

(B) xylene formaldehyde resin having phenolic hydroxyl groups; and
   (C) amino group-containing compound,
   wherein, based on the total solid mass of the modified epoxy resin (A), xylene formaldehyde resin (B) having phenolic hydroxyl groups, and amino group-containing compound (C), 50-90 mass % of the modified epoxy resin (A), 1-35 mass % of the xylene formaldehyde resin (B) having phenolic hydroxyl groups, and 5-25 mass % of the amino group-containing compound (C).

2. A cationic electrodeposition paint composition according to claim 1, in which $R^1$ and $R^2$ each stand for a methyl group.

3. A cationic electrodeposition paint composition according to claim 1, in which the epoxy resin (a2) has a number-average molecular weight of 340-1,500.

4. A cationic electrodeposition paint composition according to claim 1, in which the epoxy resin (a2) is a compound represented by formula (5):

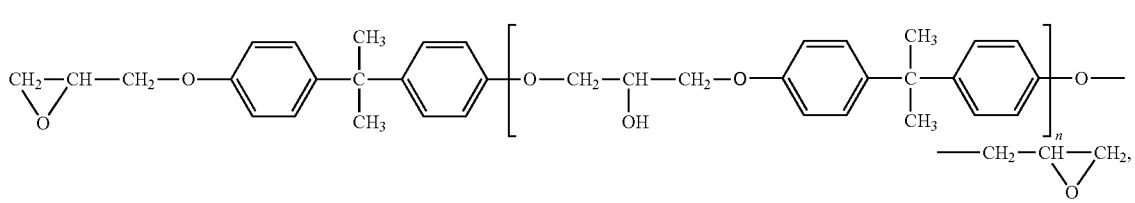

wherein n is 0-2.

5. A cationic electrodeposition paint composition according to claim 1, in which the bisphenols (a3) are the compounds represented by general formula (6):

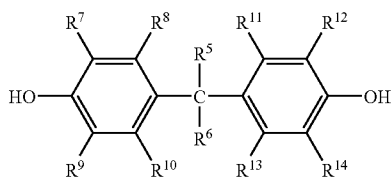

(6)

wherein $R^5$ and $R^6$ each stand for a hydrogen atom or a methyl group, and $R^7, R^8, R^9, R^{10}, R^{11}, R^{12}, R^{13}$ and $R^{14}$ each stand for a hydrogen atom or a methyl group.

6. A cationic electrodeposition paint composition according to claim 1, in which the modified epoxy resin (A) is obtained by reaction of, based on the total solid mass of the diepoxy compound (a1), epoxy resin (a2) and bisphenols (a3), 1-35 mass % of diepoxy compound (a1), 10-80 mass % of epoxy resin (a2) and 10-60 mass % of bisphenols (a3).

7. A cationic electrodeposition paint composition according to claim 1, in which the modified epoxy resin (A) has an epoxy equivalent of 500-3,000.

8. A cationic electrodeposition paint composition according to claim 1, in which the xylene formaldehyde resin (B) having phenolic hydroxyl groups has a viscosity of 20-50,000 mPa·s (25° C.) and a hydroxyl equivalent of 100-50,000.

9. A cationic electrodeposition paint composition according to claim 1, which further contains a blocked polyisocyanate curing agent as a resin component.

10. A cationic electrocoating bath containing a cationic electrodeposition paint composition according to claim 1, of which organic solvent (D) content does not exceed 1.0 mass % and total organic solvent content does not exceed 2.0 mass %, based on the total mass of the electrocoating bath, the organic solvent (D) having a solubility parameter of 8-10 and solubility in water of at least 95 mass %.

11. Coated articles obtained by electrocoating using a cationic electrodeposition paint composition according to claim 1.

12. Coated articles obtained by electrocoating using the cationic electrocoating bath according to claim 10.

* * * * *